(12) United States Patent
Boretto et al.

(10) Patent No.: US 7,258,825 B2
(45) Date of Patent: *Aug. 21, 2007

(54) METHOD FOR MANUFACTURING A CERAMIC FOAM

(75) Inventors: Gianmarco Boretto, Orbassano (IT); Massimo Debenedetti, Orbassano (IT); Diego Marzorati, Orbassano (IT)

(73) Assignee: CRF Societa Consortile per Azioni, Orbassano (Torino) (IT)

( * ) Notice: Subject to any disclaimer, the term of this patent is extended or adjusted under 35 U.S.C. 154(b) by 610 days.

This patent is subject to a terminal disclaimer.

(21) Appl. No.: 10/307,277

(22) Filed: Dec. 2, 2002

(65) Prior Publication Data

US 2003/0143130 A1   Jul. 31, 2003

Related U.S. Application Data

(63) Continuation of application No. 09/959,926, filed as application No. PCT/IT00/00188 on May 12, 2000, now abandoned.

(30) Foreign Application Priority Data

May 14, 1999   (IT)   ............................... TO99A0403

(51) Int. Cl.
*B29C 44/00* (2006.01)
*B01D 53/34* (2006.01)

(52) U.S. Cl. ...................................... 264/43; 264/45.1
(58) Field of Classification Search ............ 264/41–43, 264/45.1, 266
See application file for complete search history.

(56) References Cited

U.S. PATENT DOCUMENTS

| | | | |
|---|---|---|---|
| 3,090,094 A | * | 5/1963 | Schwartzwalder et al. .. 264/628 |
| 3,451,841 A | * | 6/1969 | Schwartzwalder et al. ........................ 428/312.8 |
| 3,536,480 A | * | 10/1970 | Winkler ........................ 419/2 |
| 3,726,811 A | * | 4/1973 | Toombs et al. ............. 502/415 |
| 4,436,538 A | | 3/1984 | Tomita et al. |
| 4,760,038 A | * | 7/1988 | Kinney et al. ............. 501/105 |
| 4,828,807 A | | 5/1989 | Domesle et al. |
| 4,839,049 A | | 6/1989 | Kinney, Jr. |
| 4,866,011 A | * | 9/1989 | Hargus et al. ................. 501/82 |
| 4,885,263 A | * | 12/1989 | Brockmeyer et al. ......... 501/81 |
| 5,000,929 A | * | 3/1991 | Horiuchi et al. ......... 423/213.5 |
| 5,039,340 A | * | 8/1991 | Hargus et al. ................. 501/81 |
| 5,279,737 A | * | 1/1994 | Sekhar et al. ............... 210/490 |

(Continued)

FOREIGN PATENT DOCUMENTS

DE    40 31 385 A    4/1991

(Continued)

*Primary Examiner*—Carlos Lopez
(74) *Attorney, Agent, or Firm*—Sughrue Mion, PLLC

(57) ABSTRACT

A filtering body is obtained for particulate of diesel engines, consisting of a ceramic foam that is produced, starting from a ceramic-material powder-based suspension (slurry), by preparing a perform of polymeric foam material and impregnating the said perform with the ceramic-powder slurry so as to distribute the slurry evenly on the perform, and by then subjecting the body thus obtained to a thermal cycle of sintering in such a way as to pyrolyze the polymeric material and obtain a high-porosity ceramic material. The ceramic-material powder is chosen from among mullite powder, alumina powder, zirconia powder, and mixtures thereof, having very high purity, controlled grain-size, and a high specific surface.

11 Claims, 2 Drawing Sheets

U.S. PATENT DOCUMENTS

| | | | |
|---|---|---|---|
| 5,423,904 A * | 6/1995 | Dasgupta | 96/146 |
| 5,457,945 A * | 10/1995 | Adiletta | 55/301 |
| 5,655,212 A * | 8/1997 | Sekhar et al. | 428/552 |
| 6,773,479 B2 * | 8/2004 | Debenedetti et al. | 55/482 |

FOREIGN PATENT DOCUMENTS

| | | |
|---|---|---|
| EP | 0 212 230 A | 3/1987 |

* cited by examiner

Fig_1
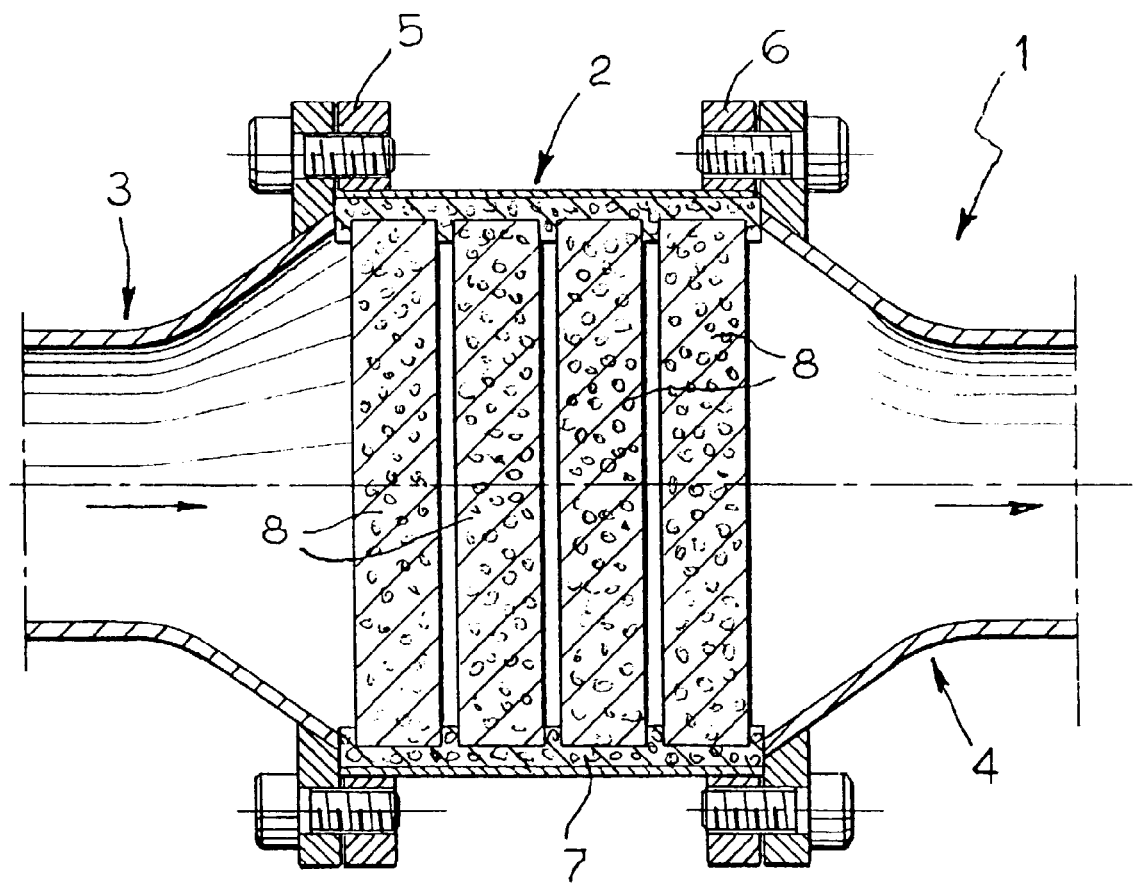

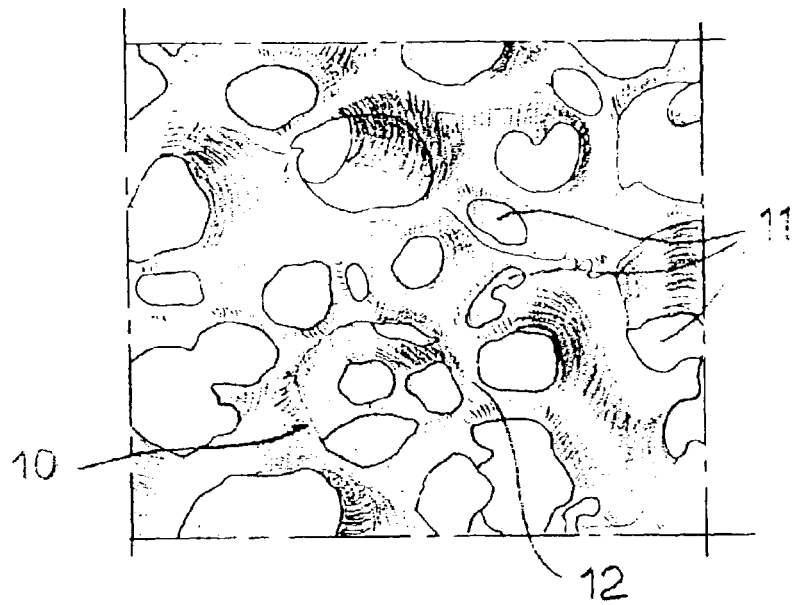
Fig_2
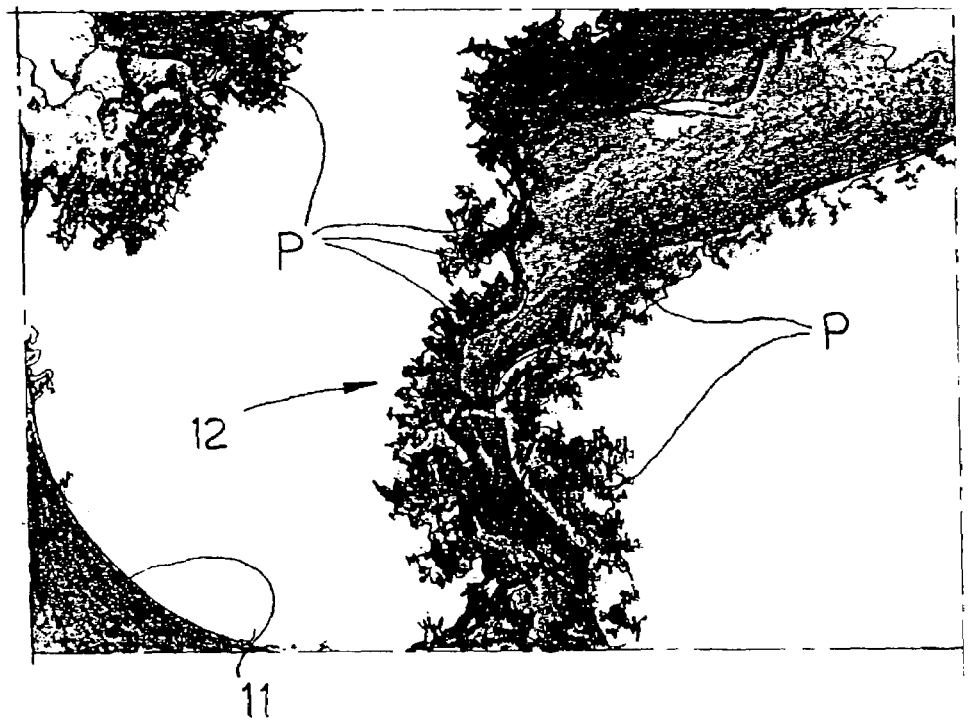
Fig_3

METHOD FOR MANUFACTURING A CERAMIC FOAM

This is a Continuation Application of U.S. application Ser. No. 09/959,926, now abandoned, which is a Continuation Application of PCT Application No. PCT/IT00/00188 filed May 12, 2000; the above noted prior applications are all hereby incorporated by reference.

SCOPE OF THE INVENTION

The present invention relates to a process for producing a particulate filter for diesel engines. Processes of this type are already known which envisage the preparation of a filtering body consisting of a ceramic foam, on which an oxidizing catalyst is deposited, in said processes the ceramic foam being produced, starting from a ceramic-material powder-based suspension (slurry), by preparing a perform of polymeric foam material and impregnating the said perform with the above-mentioned ceramic-powder slurry so as to distribute the slurry evenly on the perform, and by then subjecting the body thus obtained to a thermal cycle of sintering in such a way as to pyrolyze the polymeric material and obtain a high-porosity ceramic material having a morphology similar to that of the starting polymeric material. A process of this type is, for example, described and illustrated in the U.S. Pat. No. 4,540,535.

PRIOR ART

Notwithstanding the considerable progress achieved with the development of direct-injection diesel engines in terms of reduction in consumption and in harmful exhaust emissions, the availability of efficient systems for the treatment of exhaust gases is an indispensable requisite for meeting the increasingly stringent limits set by current standards and regulations. For example, the European Community standard EURO IV (2005) envisaged for vehicles of high inertial class (over 1400 kg) will halve the maximum values allowed for the particulate and nitrogen oxides emitted, as compared to previous standards.

Among the various possible solutions, systems have already been proposed for the abatement of particulate which envisage a filtering device that is self-regenerable, so as to prevent accumulation of carbon particles which would jeopardize the efficiency of the engine. The use of active systems for inducing regeneration (burners, electric heaters, microwaves, plasma) at present involves a complexity and costs that are far from compatible with the requirements of motor-vehicles manufacturers. Consequently, in this field the most interesting solutions cannot disregard the use of catalysts that are able to cause combustion of the particulate directly at the temperatures of the exhaust gases (i.e., approximately between 150° C. and 300° C.) without any energy contribution from outside. The various strategies that have been proposed in the last few years may basically be divided into two categories: the first includes the introduction of catalytic additives in the fuel, whilst the second includes systems in which the catalyst is deposited on the filtering substrate.

As far as the first solution is concerned, even though it has been demonstrated that, with an appropriate combination of filtering body and additives (mainly organo-metallic or cerium-based additives) satisfactory results can be achieved in terms of regeneration, there are undoubtedly certain disadvantages linked to the need for a reformulation of the fuel (or to the introduction of systems for mixing the additives with the gas-oil) and to the emission of metal oxides into the environment by the exhaust system, as well as to possible problems of reliability.

As regards, instead, the second solution, the conventional catalyzed traps so far proposed are penalized by a substantial insufficiency of the catalytic activity in inducing continuous regeneration. In particular, in the case of filters of the so-called "wall-flow monolith" type, which operate through a "cake" filtering mechanism, with an efficiency of over 90% (see, for example, the European patent EP-A-0 154 145), the main problem is represented by the poor contact between the particulate and the catalytic deposit, which becomes increasingly less efficient as the filtered mass increases. In these conditions, regeneration cannot take place continuously, but only when the increase in back pressure causes an increase in temperature. However, the sudden release of a high amount of heat may induce, in the trap, thermal stresses of considerable degree, thus causing structural yielding of the trap itself. Even though local accumulation of particulate is prevented, by exploiting deep-filtering mechanisms that are typical of cellular materials, conventional oxidizing catalysts, which are based on noble metals, reveal even so a very reduced activity on account of the small contact surface that can be shared between the solid carbon particles and the active sites.

One solution that is able to overcome the problems referred to above is represented by the continuous regenerating trap (CRT) system proposed by Johnson Matthey (SAE Paper 970182, 1997 "Experience with a New Particulate Trap Technology in Europe", as well as the U.S. Pat. No. 4,902,487 and EP-A-0341832). On the basis of the fact that oxidation of the particulate by means of $NO_2$ can take place at temperatures approximately 300° C. lower than with oxygen (250° C. are sufficient), a device has been developed that combines an oxidizing catalyst (platinum/alumina), which is able to convert the $NO_x$ present in the exhaust gases into $NO_2$, with a non-catalyzed wall-flow trap set immediately downstream of the catalyst, in which regeneration is promoted precisely by the nitrogen dioxide. However, the above system is able to work properly only if the amount of sulphur present in the fuel is lower than 25 ppm: higher values cause poisoning of the active sites, reduce the efficiency of conversion of the $NO_x$, and inhibit regeneration.

The improvement in the quality of gas-oil expected by the year 2005 envisages a reduction in the sulphur content down to 50 ppm, which, however, remains insufficient, in the present state of the art, for the above-mentioned known device to work adequately. The said device, moreover, is relatively costly.

As has already been mentioned at the beginning of the present description, filtering devices for particulate have already been proposed (see, for example, the aforementioned U.S. Pat. No. 4,540,535) which envisage the combined use of a ceramic-based filtering structure of a cellular type and of a catalyst carried by the latter. The particulate filtered by the foam porous structure can come into contact with the catalytic deposit in an efficient way, throughout the thickness of the device. Head losses are generally lower than in wall-flow systems, notwithstanding the fact that filtering efficiency is maintained at more than acceptable values (higher than 80%) for the amount of particulate emitted by modern diesel engines.

The main problems that the above structures present are essentially linked to the insufficient thermo-mechanical properties (in particular resistance to vibrations and thermal shock) and to the incompatibility with catalysts promoting combustion of the particulate, hereinafter referred to as "oxidizing catalysts", other than noble metals (namely, with liquid-phase supported catalysts). See in this connection the following articles:

Badini C., Saracco G., Serra V., Specchia V., *"Suitability of some promising soot combustion catalysts for application in Diesel exhaust treatment"* Appl. Catal. B: Environmental, 18 (1998) 137-150; Badini C., Saracco G., Specchia V., *"Combustion of carbon particulate catalysed by mixed potassium vanadates and KI"* Catalysis Letter, 55 (1998) 20-???206; Jelles S. J., van Setten B. A. A. L., Makkee M., Moulijn J. A., *"Supported Liquid-Phase Catalysts: a New Approach for the Catalytic Oxidation in Diesel Exhaust Particulate Control"* in Proceedings of the CAPOC 4 Congress, Brussels, Belgium, April 1997).

PURPOSE OF THE INVENTION

The purpose of the present invention is to overcome the drawbacks referred to above by making available a process for producing a particulate filter for diesel engines of the type that envisages the preparation of a filtering body consisting of a ceramic foam on which an oxidizing catalyst is deposited, that will enable a more satisfactory compromise to be reached between the requirements of high filtering efficiency, low head loss, and high thermo-mechanical properties of the structure of the filter, as well as compatibility with a wide range of catalysts.

THE INVENTION

With a view to achieving the purpose- specified above, the subject of the present invention is a process for producing a particulate filter for diesel engines which envisages the preparation of a filtering body consisting of a ceramic foam, on which an oxidizing catalyst is deposited, in said process the ceramic foam being produced, starting from a ceramic-material powder-based suspension (slurry), by preparing a perform of polymeric foam material and impregnating the said perform with the above-mentioned ceramic-powder slurry so as to distribute the slurry evenly on the perform, and by then subjecting the body thus obtained to a thermal cycle of sintering in such a way as to pyrolyze the polymeric material and obtain a high-porosity ceramic material having a structure similar to that of the starting polymeric material, characterized in that the ceramic-material powder is chosen from among mullite ($3Al_2O_3$-$2SiO_2$) powder, alumina ($Al_2O_3$) powder, and zirconia ($ZrO_2$) powder (possibly stabilized with yttrium), or mixtures thereof, having a purity of over 97%, mean size of the particles of less than 2 μm, and a specific surface at least greater than 5 $m^3$/g.

Experiments conducted by the present applicant have shown that the process according to the present invention makes it possible to obtain a substantial increase in the mechanical properties, given the same relative density, of over 200%, and a simultaneous reduction in head loss, of the order of 50%, without any reduction in the filtering efficiency and with excellent compatibility with a wide range of oxidizing catalysts, as compared to the results obtainable with ceramic foams of the known type.

BRIEF DESCRIPTION OF THE FIGURES

Further characteristics and advantages of the present invention will emerge from the ensuing description, with reference to the attached drawings, in which:

FIG. 1 is a sectional view of an example of embodiment of a particulate filter according to the present invention;

FIG. 2 is an enlarged detail of a ceramic foam; and

FIG. 3 is a further enlargement illustrating the filtering mechanism used in the filter according to the invention.

DESCRIPTION OF A PREFERRED EMBODIMENT

With reference to FIG. 1, number 1 designates as a whole a filtering device, or trap, for diesel-engine particulate. The device 1 has a tubular metal shell 2 connected to the sections 3, 4 of the engine exhaust pipe (by means of flanges 5, 6) and comprising two half-shells provided with flanges set opposite one another (not shown in the drawing), which are screwed together.

Inside the metal shell 2, a further tubular shell 7 is set, which is made up of a pad of ceramic material (for example, vermiculite), and inside which a set of disks 8 are arranged made up of a ceramic foam according to the invention. The said disks are arranged in planes perpendicular to the axis of the pipe and have pores of decreasing size from one disk to the next in the direction of the flow of the gases (as indicated by the arrows).

According to a technique in itself known, each disk 8 consists of a body of ceramic foam on which an oxidizing catalyst is deposited. The ceramic foam is produced starting from a ceramic-material powder-based suspension (slurry).

The present applicant has discovered the possibility of obtaining surprising results based on an optimal compromise between the needs for high filtering efficiency, low head losses, high thermo-mechanical characteristics, and excellent compatibility with a wide range of oxidizing catalysts, by using high-purity mullite and/or alumina powders toughened with zirconia.

The characteristics of the powders envisaged according to the invention are summarized in the ensuing table, separately for mullite, alumina, and zirconia. Indicated for each type of powder are the chemical composition and purity, the mean particle size, the specific surface B.E.T., the commercial name and the manufacturer's name (the preferred values are given).

TABLE 1

Characteristics of the powders
(the preferable values are given in parenthesis)

| Type of powder | Chemical composition and purity | Mean size of particles (μm) | Spec. surface B.E.T. ($m^2$/g) | Name and Supplier |
|---|---|---|---|---|
| Mullite | $3Al_2O_3$ $2SiO_2$ > 97% (98.7%) | <2.0 (0.70) | >10 (18.2) | SASM Baikowski Chimie[1] |
| Alumina | $\alpha$-$Al_2O_3$ > 99.85% (99.99%) | <1.0 (0.30) | >7.5 (10.0) | SM 8 Baikowski Chimie[1] |
| Zirconia | $ZrO_2$ > 2.5-3.5% Mol. of $Y_2O_3$ (3%) | <0.8 (0.35) | >5 (6.9) | TZ 3YS E Tosoh[2] |

[1] Baikowski Chimie, Annécy, France
[2] Tosoh Corporation, Tokyo, Japan

The use of the powders specified above, which present very high purity, controlled grain size, and high specific surface, enables the achievement of excellent properties of sintering (reduced microporosity and high mechanical properties), as well as the possibility of obtaining cellular materials with more than one hundred pores per inch (ppi) and absolute compatibility with liquid-phase catalysts, for example vanadate-based, caesium-based, and potassium-based ones, which are able to promote oxidation of the particulate starting from 350° C. (see the technical literature referred to above).

According to the invention, alumina foams are envisaged toughened with zirconia (ZTA), or mullite foams toughened with zirconia (ZTM), with 0-45 vol % of zirconia. The best results have been obtained with 30 vol % of zirconia for ZTA, and 45 vol % for ZTM.

As already specified above, the process according to the invention follows an already known method defined in the literature as "polymeric sponge process" (see, for example, U.S. Pat. No. 3,090,094). This method basically consists in impregnating a perform made of open-celled polyurethane foam with a ceramic-powder suspension (slurry) so as to coat the structure of the perform evenly. Preparation of the ceramic suspension may involve appropriate additives in order to obtain an optimal Theological behaviour. In particular, to achieve optimal coating of the bridges dividing one cell from another in the polymeric structure, it is necessary for the slurries to be pseudoplastic (i.e., with decreasing viscosity as the rate of shear strain increases) and/or thixotropic (i.e., with viscosity which for decreasing shear strain rates is lower than that occurring for increasing shear strain rates). In fact, in this case, the viscosity remains low during impregnation (when high shear strain rates are applied), but increases immediately afterwards (when very low shear strain rates are applied), so enabling the suspension to remain evenly deposited over the bridges. For this purpose, specific additives (binders) are added, capable of bestowing the said property on the slurry.

In the ensuing Tables 2, 3, 4, and 5, formulations of monophasic suspensions (alumina, mullite, zirconia only) are given. Tables 6 and 7, instead, give the compositions corresponding to two alternative solutions with ZTA and ZTM.

TABLE 2

Alumina slurry
(the recommended values are given in the last 3 columns)

| Component | Relative quantity (with respect to total powder, wt %) | Absolute quantity (g) | Relative quantity (wt %) | Relative quantity (vol %) |
|---|---|---|---|---|
| Alumina (Baikowski SM 8) | — | 100 | 80.3% | 51.3% |
| Water (pH 10) | 20-25% | 22.0 | 17.7% | 43.7% |
| Dispersant[1] | 0.5-1.5% | 1.0 | 0.8% | 2.0% |
| Binder (polyethylene oxide)[2] | 0.5-2.5% | 1.5 | 1.2% | 3.0% |

TABLE 3

Zirconia slurry
(the recommended values are given in the last 3 columns)

| Component | Relative quantity (with respect to total powder, wt %) | Absolute quantity (g) | Relative quantity (wt %) | Relative quantity (vol %) |
|---|---|---|---|---|
| Zirconia (Tosoh TZ 3YS E) | — | 100 | 81.0% | 41.3% |
| Water (pH 10) | 20-25% | 21.0 | 17.0% | 52.5% |
| Dispersant[1] | 0.5-1.5% | 1.0 | 0.8% | 2.5% |
| Binder (polyethylene oxide)[2] | 0.5-2.5% | 1.5 | 1.2% | 3.7% |

TABLE 4

Mullite slurry
(the recommended values are given in the last 3 columns)

| Component | Relative quantity (with respect to total powder, wt %) | Absolute quantity (g) | Relative quantity (wt %) | Relative quantity (vol %) |
|---|---|---|---|---|
| Mullite (Baikowski SASM)) | — | 100 | 76.0% | 50.1% |
| Water (pH 10) | 27-33% | 29.1 | 22.1% | 45.9% |
| Dispersant[1] | 0.5-1.5% | 1.0 | 0.8% | 1.6% |
| Binder (polyethylene oxide)[2] | 0.5-2.5% | 1.5 | 1.1% | 2.4% |

TABLE 5

Mullite slurry with sintering aid
(the recommended values are given in the last 3 columns)

| Component | Relative quantity (with respect to total powder, wt %) | Absolute quantity (g) | Relative quantity (wt %) | Relative quantity (vol %) |
|---|---|---|---|---|
| Mullite (Baikowski SASM)) | — | 100 | 72.83% | 46.4% |
| Sintering aid (MgO) | 0.5-1.5% | 1.0 | 0.73% | 0.5% |
| Water (pH 10) | 30-35% | 33.8 | 24.62% | 49.5% |
| Dispersant[1] | 0.5-1.5% | 1.0 | 0.73% | 1.5% |
| Binder (polyethylene oxide)[2] | 0.5-2.5% | 1.5 | 1.09% | 2.2% |

TABLE 6

ZTA slurry, 30 vol %
(the recommended values are given in the last 3 columns)

| Component | Relative quantity (with respect to total powder, wt %) | Absolute quantity (g) | Relative quantity (wt %) | Relative quantity (vol %) |
|---|---|---|---|---|
| Alumina | 57-62% | 59.9 | 48.3% | 33.5% |
| Zirconia | 38-43% | 40.1 | 32.3% | 14.4% |
| Water (pH 10) | 20-25% | 21.6 | 17.4% | 46.7% |
| Dispersant[1] | 0.5-1.5% | 1.0 | 0.8% | 2.2% |
| Binder (polyethylene oxide)[2] | 0.5-2.5% | 1.5 | 1.2% | 3.2% |

TABLE 7

ZTM slurry, 45 vol %
(the recommended values are given in the last 3 columns)

| Component | Relative quantity (with respect to total powder, wt %) | Absolute quantity (g) | Relative quantity (wt %) | Relative quantity (vol %) |
|---|---|---|---|---|
| Mullite | 36-41% | 38.9 | 30.8% | 25.2% |
| Zirconia | 59-64% | 61.1 | 48.2% | 20.6% |
| Water (pH 10) | 20-25% | 24.1 | 19.0% | 49.2% |
| Dispersant[1] | 0.5-1.5% | 1.0 | 0.8% | 2.0% |
| Binder (polyethylene oxide)[2] | 0.5-2.5% | 1.5 | 1.2% | 3.1% |

[1]Dolapix CE 64, Zschimmer & Schwarz Chemische Fabriken, Lahnstein, Germany, or Darvan C.R.T. Vanderbilt Co., Norwalk, CT, USA, or similar electrosteric dispersant
[2]Polyethylene oxide M.W. 100 000, Aldrich-Chemie, Steinheim, Germany (20% aqueous solution)

In the process according to the invention, the slurry is prepared by ball-mixing using alumina balls for 24 hours. The polymeric foam is then impregnated with the slurry and passed between counter-rotating rollers to remove the excess slurry. This is followed by a drying process for 30 to 40 hours (preferably 36 hours) and heat treatment with slow heating up to 400° C. (1° C./min), for elimination of the polyurethane substrate, followed by an increase in temperature up to 1500° C. (in the case of ZTA) or 1600° C. (in the case of ZTM) at a rate of 5° C./min, at which sintering takes place (for a duration of 3 hours), and subsequent cooling at a rate of 5° C./min.

The structure obtained (see FIG. 2) presents cells 10 with pores 11 interspersed with bridges 12.

The tests carried out by the present applicant have revealed how the structure obtained presents a substantial increase in the mechanical properties, given the same relative density, in the region of more than 200% and a simultaneous reduction in head loss, in the region of 50%, without any reduction in filtering efficiency and with an excellent compatibility with a wide range of oxidizing catalysts.

The filtering mechanism obtained is illustrated in the drawing of FIG. 3, which was obtained from a photograph taken using an electron microscope. The drawing shows how the particulate P is filtered not so much in that it is not allowed to pass through the pores, but rather in that it adheres by impact to the bridges 12. The pores thus remain substantially free so as to prevent any major head loss that would adversely affect engine performance.

Of course, without prejudice to the principle of the invention, the details of construction and the embodiments may vary widely with respect to what is described and illustrated herein purely for the purpose of providing an example.

What is claimed is:

1. A process for making an intermediate product for producing a filter comprising:
preparing a ceramic foam by preparing a perform of polymeric foam material, impregnating the perform with a ceramic-powder slurry, and subjecting the impregnated perform to a thermal cycle of sintering, wherein the ceramic-material powder slurry is selected from the group consisting of mullite ($3Al_2O_3$-$2SiO_2$) powder, alumina ($Al_2O_3$) powder, and zirconia ($ZrO_2$) powder, and mixtures thereof, and wherein the ceramic-material powder slurry has a purity of over 97%, mean (number based) particle size of less than 2 μm, and a specific B.E.T. surface at least greater than 5 $m^2/g$, and
depositing an oxidizing catalyst on the ceramic foam to produce a filter.

2. A process according to claim 1, wherein when the ceramic-material powder slurry consists of mullite powder, the mullite powder has a purity of over 98.7%, a mean particle size of about 0.7 μm, and a specific surface B.E.T. greater than 17 $m^2/g$.

3. A process according to claim 1, wherein when the ceramic-material powder slurry consists of alumina powder, the alumina powder has a purity of over 99.9%, a mean particle size of less than 0.3 μm, and a specific surface B.E.T. greater than 10 $m^2/g$.

4. A process according to claim 1, wherein when the ceramic-material slurry powder consists of zirconia powder, the zirconia powder has a mean particle size of less than 0.35 μm, and a specific surface B.E.T. greater than 6.9 $m^2/g$.

5. A process according to claim 1, wherein the slurry comprises between 57 wt % and 62 wt % of alumina powder and from 38 wt % to 43 wt % of zirconia powder.

6. A process according to claim 1, wherein the slurry comprises between 36 wt % and 41 wt % of mullite powder and from 59 wt % to 64 wt % of zirconia powder.

7. A process according to claim 1, wherein the slurry comprises 26-35 vol % of zirconia powder with respect to the alumina powder.

8. A process according to claim 1, wherein the slurry comprises 40-50 vol % of zirconia powder with respect to the mullite powder.

9. A process according to claim 1, wherein the thermal cycle of sintering comprises a first phase of heating up to a temperature of 300-500° C. at a rate of 0.5 to 1.5° C./min, a second phase of heating up to the maximum temperature at a rate of 3 to 10° C./min, and a subsequent cooling at a rate of 3 to 10° C./min.

10. A process according to claim 8, wherein the thermal cycle of sintering comprises heating up to a maximum temperature of 1500° C. in the case of alumina toughened with zirconia, and 1600° C. in the case of mullite toughened with zircorna.

11. A process according to claim 1, wherein the slurry comprises an electrosteric dispersant and a binding agent.

* * * * *